United States Patent [19]

Jacobsen

[11] Patent Number: 4,815,074
[45] Date of Patent: Mar. 21, 1989

[54] HIGH SPEED BIT INTERLEAVED TIME DIVISION MULTIPLEXER FOR MULTINODE COMMUNICATION SYSTEMS

[75] Inventor: Christian C. Jacobsen, Brookfield, Conn.

[73] Assignee: General DataComm, Inc., Middlebury, Conn.

[21] Appl. No.: 893,168

[22] Filed: Aug. 1, 1986

[51] Int. Cl.[4] .............................................. H04J 3/04
[52] U.S. Cl. ...................................... 370/112; 370/84
[58] Field of Search ..................... 370/112, 85, 67, 84

[56] References Cited

U.S. PATENT DOCUMENTS

| | | | |
|---|---|---|---|
| 4,375,681 | 3/1983 | Abbott et al. | 370/84 |
| 4,488,293 | 12/1984 | Haussmann et al. | 370/84 |
| 4,685,101 | 8/1987 | Segal et al. | 370/84 |

Primary Examiner—Douglas W. Olms
Assistant Examiner—Wellington Chin
Attorney, Agent, or Firm—David P. Gordon

[57] ABSTRACT

A bit interleaved time division multiplexer for multinode system is provided and includes a high speed bus, a plurality of aggregate common blocks, a plurality of channel common blocks, and a system controller which selects the aggregate and channel common blocks and which is connected to the bus. Each aggregate common block includes an address recognizer, a recorder for obtaining information according to a first frame format from an aggregate line, supplying an intramultiplexer system address for at least one bit of the obtained information, and sending the information accompanied by the intramultplexer system address onto the high speed bus, and a recorder and transmitter for receiving bits of information from the high speed bus, multiplexing the information according to a second frame format and sending the so-multiplexed information out over an aggregate line. Each channel common block includes a channel address recognizer, a channel decoder for receiving information from the high speed bus and sending the information to its proper channel, and a channel multiplexer for multiplexing information from a plurality of channels into a bit stream according to a third frame format, sending the bit stream onto the high speed bus, and supplying an intramultiplexer system address to accompany the bits of the bit stream.

28 Claims, 9 Drawing Sheets

HIGH SPEED BIT INTERLEAVED TIME DIVISION MULTIPLEXER FOR MULTINODE COMMUNICATION SYSTEMS

This invention relates to time division multiplexers, and more particularly to architectures for a high speed bit interleaved time division multiplexer for multinode communication systems.

Apparatus for time division multiplexing have been known in the arts for some time. Typically, multiplexers are comprised of interfaces to a plurality of channels and to an aggregate, buffers for incoming and outgoing information, and a frame which includes a memory means and a recirculating counter which addresses the memory means. The frame is used to select information from a plurality of channels for sending over an aggregate line according to a framing algorithm. The frame typically frames both data from the plurality of channels, control information from the channels, and multiplexer overhead information such as intermultiplexer communication and synchronization bits. Demultiplexers, which decode the information being received over the aggregate, typically include a frame which is programmed in a manner similar to the frame of the multiplexer such that the received bits of information can be properly sent to the channels for which they were meant. Such a multiplexer-demultiplexer system is presently known as a "point to point" system.

More recently, multinode networks have become known in the art. Each node of such a network is given the capability of communicating over a plurality of aggregates. In such a manner, if any aggregate line connecting two nodes is down, the information may be sent via other nodes to the desired locations. The standard multinode networks of the art, while providing improved service over the point to point systems, require sophisticated arbitration systems with buffers and other circuitry to arbitrate the simultaneous requests of various channels to the single transmit bus or single receive bus. Thus, if a single channel is provided access to a plurality of multiplexers via a single bus, the channel must request access to the bus from the arbitrator in proportion to its channel speed and then receive an enable from the arbitrator prior to sending any information. If separate transmit and receive busses are used for the node, means must be provided to connect the busses together when it is desired to bypass an aggregate. Indeed, in the standard multinode networks of the art, physical bypasses must be installed on a node when a line is disconnected and information is sent to one node via the bypassed node.

SUMMARY OF THE INVENTION

It is therefore an object of this invention to provide a high speed bit interleaved multiplexer for a multinode system which obviates the need for arbitration systems.

It is a further object of the invention to provide a nonarbitrated multiplexer for multinode systems which requires no additional circuitry or hardware to perform a bypass function.

In accord with the objects of the invention, a high speed bit interleaved multiplexer for a multinode system is provided and generally comprises:
(a) a high speed bus;
(b) at least two aggregate common means, each aggregate common means including,
  (1) aggregate common address recognition means for recognizing when the particular aggregate common means is being addressed,
  (2) recoding means for obtaining information according to a first frame over an aggregate, supplying an intramultiplexer system address for at least one bit of said obtained information, and sending said at least one bit of information accompanied by said intramultiplexer system address onto said high speed bus,
  (3) aggregate common decoding means for receiving bits of information from said high speed bus and for sending the received bits to a set of buffers in said particular aggregate common means when the aggregate common address recognition means indicates that said particular aggregate common means is being addressed, and
  (4) aggregate transmit multiplexing means for multiplexing said information in said set of buffers of said particular aggregate common means according to a second frame and for sending said information over an aggregate;
(c) at least one channel common means, each channel common means including,
  (1) channel common address recognition means for recognizing when the particular channel common means is being addressed,
  (2) channel common decoder means for receiving bits of information from said high speed bus and for sending the received bits to their proper channels when the channel common address recognition means indicates that said particular channel common means is being addressed, and
  (3) channel common multiplexing means for multiplexing information from a plurality of channels into a bit stream according to a third frame, for supplying an intramultiplexer system address for at least one bit of said bit stream, and for sending at least one bit of information of said bit stream accompanied by said intramultiplexer system address over said high speed bus, and
(d) system control means connected to said high speed bus, said system control means including means for generating select signals for each of said aggregate common and channel common means, wherein when said channel common means and aggregate common means are respectively selected they each send at least a bit of information accompanied by an intramultiplexer system address on said high speed bus.

For purposes herein, the term "select" should be taken to mean a time period during which information can be put on the bus.

The multiplexer of the invention has a three-tiered design. In sending bits of information from a channel over an aggregate, it will be seen that in the first tier, the information bits from channels are multiplexed by the channel common means according to the frame of the channel common means. The channel common means provides an intramultiplexer system address for each multiplexed bit of information. In the second tier, the system control means sequentially polls the channel common means which places the information bits and intramultiplexer system address on a high speed bus, thereby multiplexing the already multiplexed information. The destination of each multiplexed bit is the intramultiplexer system address provided by the channel common means and may be any of the channel common means or any of a plurality of aggregate common means. In the third tier, bits of information which have been received over the high speed bus by the aggregate common means and stored in its channel buffers is multiplexed for sending over an aggregate according to the frame of the aggregate common means.

It will be appreciated that each contributor to the high speed data bus preferably has its own microprocessor and memory means for building a frame and for controlling the various functions of the contributor including a recognition of when it is being addressed. Likewise, the system control means preferably includes a microprocessor and memory means for communicating with the contributors as well as for controlling and storing nodal configurations such as data routing and channel selection. Thus, the system control can easily conduct a nodal bypass if an aggregate line is down by informing the contributors to the affected aggregate common and having the contributors reroute their information. The system control would also inform the system control of a remote multiplexer to the necessity of performing a nodal bypass. The remote multiplexer could then send all information received over a first aggregate contributor out over a second aggregate contributor.

Further objects and advantages of the invention will be more easily understood upon reference to the detailed description of the invention taken in conjunction with the figures.

DETAILED DESCRIPTION OF THE PREFERRED EMBODIMENT

Figure 1:
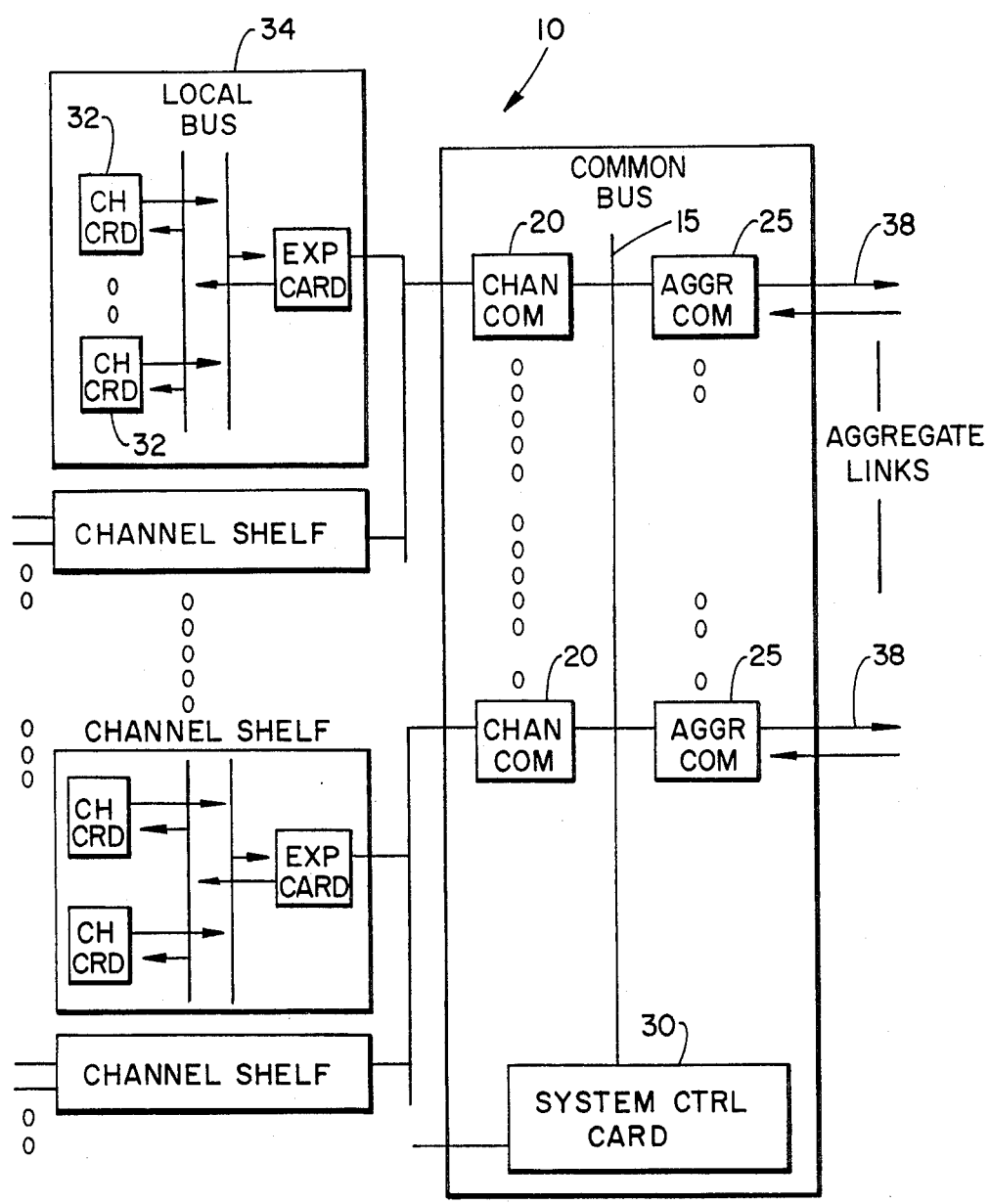
FIG. 1 is a simplified block diagram of the design of the multiplexer invention.

A basic understanding of architecture of the multiplexer 10 of the invention may be had by reference to FIG. 1. The multiplexer 10 of the invention is seen to be comprised of a single high speed bus 15, a plurality of contibutors 20 and 25 to the bus, and a system control 30. The contributors which multiplex bits of information from a plurality of channels 32 located on channel shelves 34 before contributing to the high speed bus 15 are conveniently called "channel common means", and are denoted as 20. The contributors which receive bits of information from an aggregate before contributing to the high speed bus, are called "aggregate common means" and are denoted as 25. The aggregate common means receive bits of information from the channel common means or other aggregate common means for sending out over the aggregate links 38.

Figure 2:
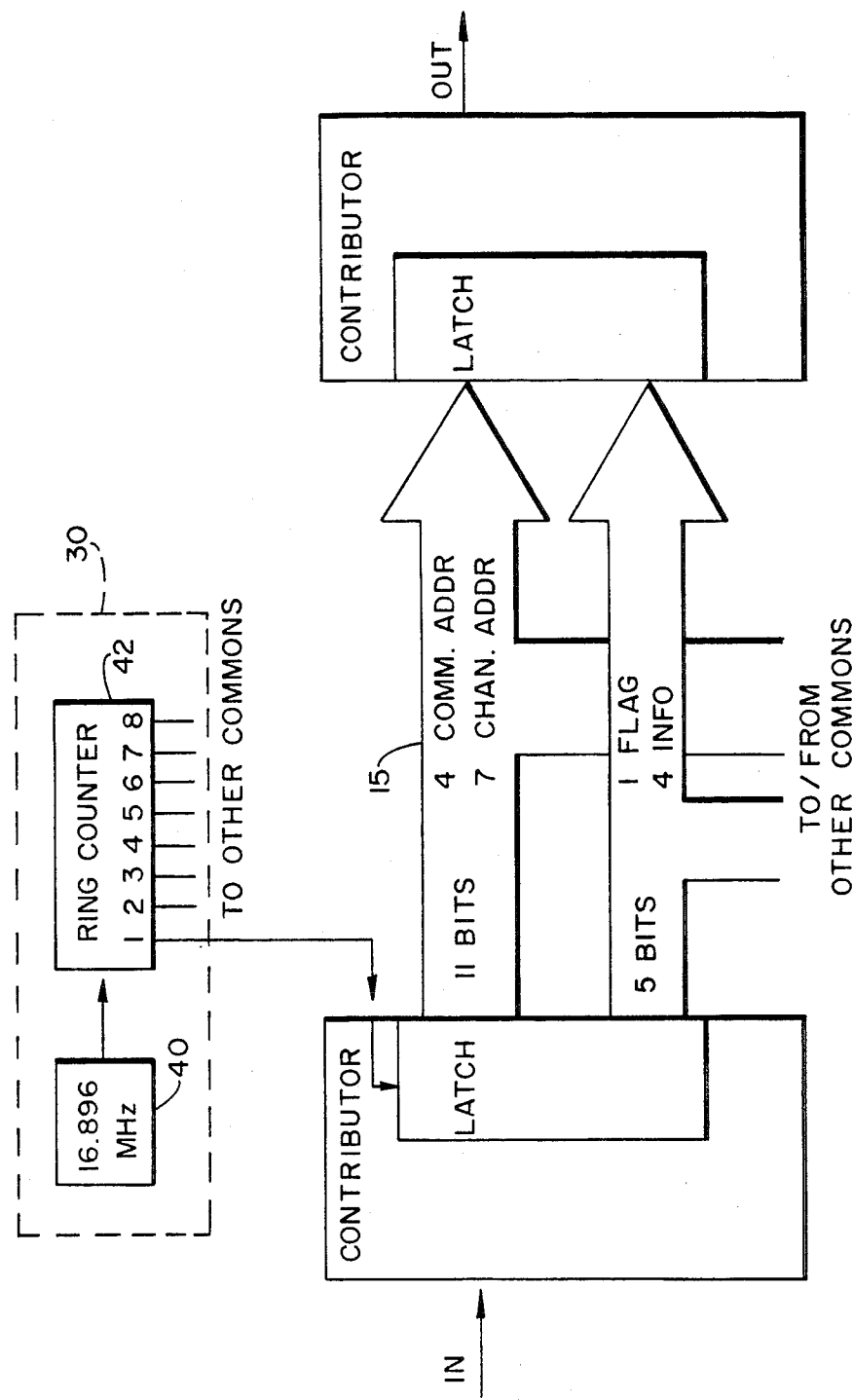
FIG. 2 is a simplified block diagram illustrating the bus of the multiplexer invention and its relationship to the other blocks of the invention.

The basic working of the multiplexer 10 is seen in FIG. 2. The system control 30 includes a high speed clock 40 and a ring counter 42 which are used to serially address the contributors 20 and 25 to the system. Upon being addressed, a specific contributor 20 or 25 is permitted (in the preferred embodiment) to place five bits of information ("data word" or "control word") onto the high speed bus 15 along with eleven system address bits. Of the five bits of information, a first "flag" bit is used to indicate whether the information to be transferred is data or control information. If the flag bit is indicative of a data word, the second bit is the data bit which is being sent. The third bit is then used to indicate a null transaction with the fourth bit being used in the aggregate common means only to indicate the presence or lack of synchronization with a remote multiplexer. The fifth bit is presently left undefined. If the flag bit is indicative of a control bit, the second through fifth bits are used as controls bits. Of course, the use of five information bits having particular meanings is only indicative of the preferred embodiment of the invention. Those skilled in the art could provide different schemes which utilize different numbers of information bits and-/or different meanings to the bits while still practicing the invention.

Of the eleven address bits (intramultiplexer system address) sent with the five information bits, four address bits are used to identify a contributor 20 or 25, and seven bits are used to identify the channel in the contributor. Thus, in the preferred multiplexer of the invention, up to sixteen contributors may be accommodated on the system with up to one hundred twenty-eight channels addressable in each contributor. Again, if desired, the number of address bits may be changed by those skilled in the art to accommodate additional contributors and/or channels per contributor. Regardless, the information bits are sent into the common bus 15 along with the address bits and the information is received by the addressed contributor, as each contributor has resident intelligence and can recognize its address and accept information via a latch.

As indicated by FIGS. 1 and 2, the multiplexer 10 of the invention has a three-tiered design. In sending information from a channel 32 over an aggregate 38, it will be seen that in the first tier, information bits from channels are multiplexed by the channel common means 20 according to the frame of the channel common means as will be more fully described herinafter. The channel common means 20 also provides an intramultiplexer system address for each multiplexed bit of information. In the second tier, the system control means 30 sequentially polls the channel common means and in response thereto, each channel common means places the information and the intramultiplexer system address on the high speed bus 15. In this manner, already multiplexed information from a plurality of contributors 20 and 25 is again multiplexed although the destinations of the information placed on bus 15 may be different. Thus, when sending information from a channel 32 to an aggregate 38, the destination of the information which is on bus 15 is the system address provided by the channel common means 20 and may be any of a plurality of aggregate common means 25. In the third tier, information which has been received over the high speed bus 15 by the aggregate common means 25 and stored in the aggregate common means channel buffers is multiplexed for sending over an aggregate 38 according to the frame of the aggregate common means.

Figure 3:
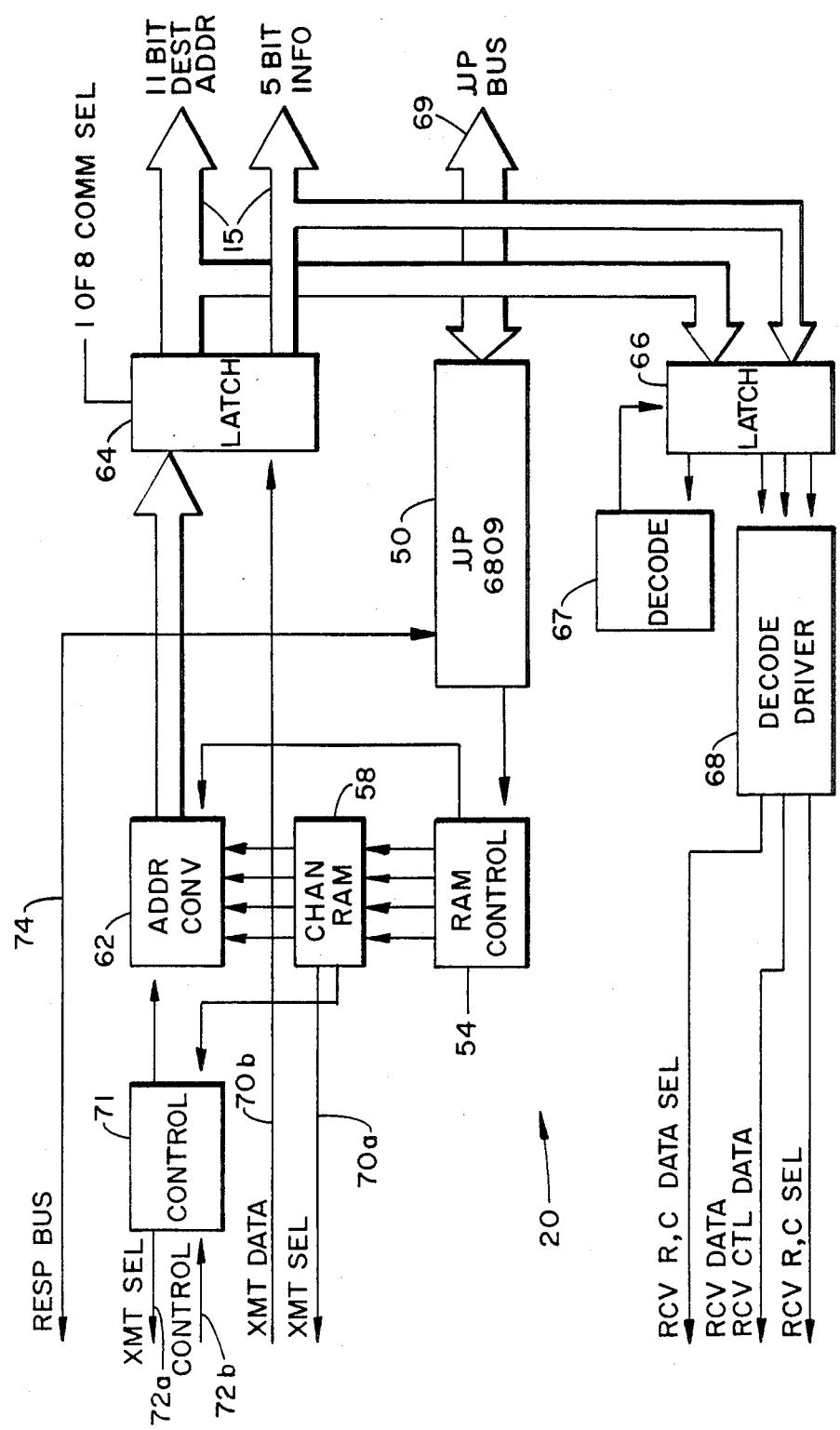
FIG. 3 is a block diagram illustrating the flow of information through the channel common means of the invention.
Figure 4:
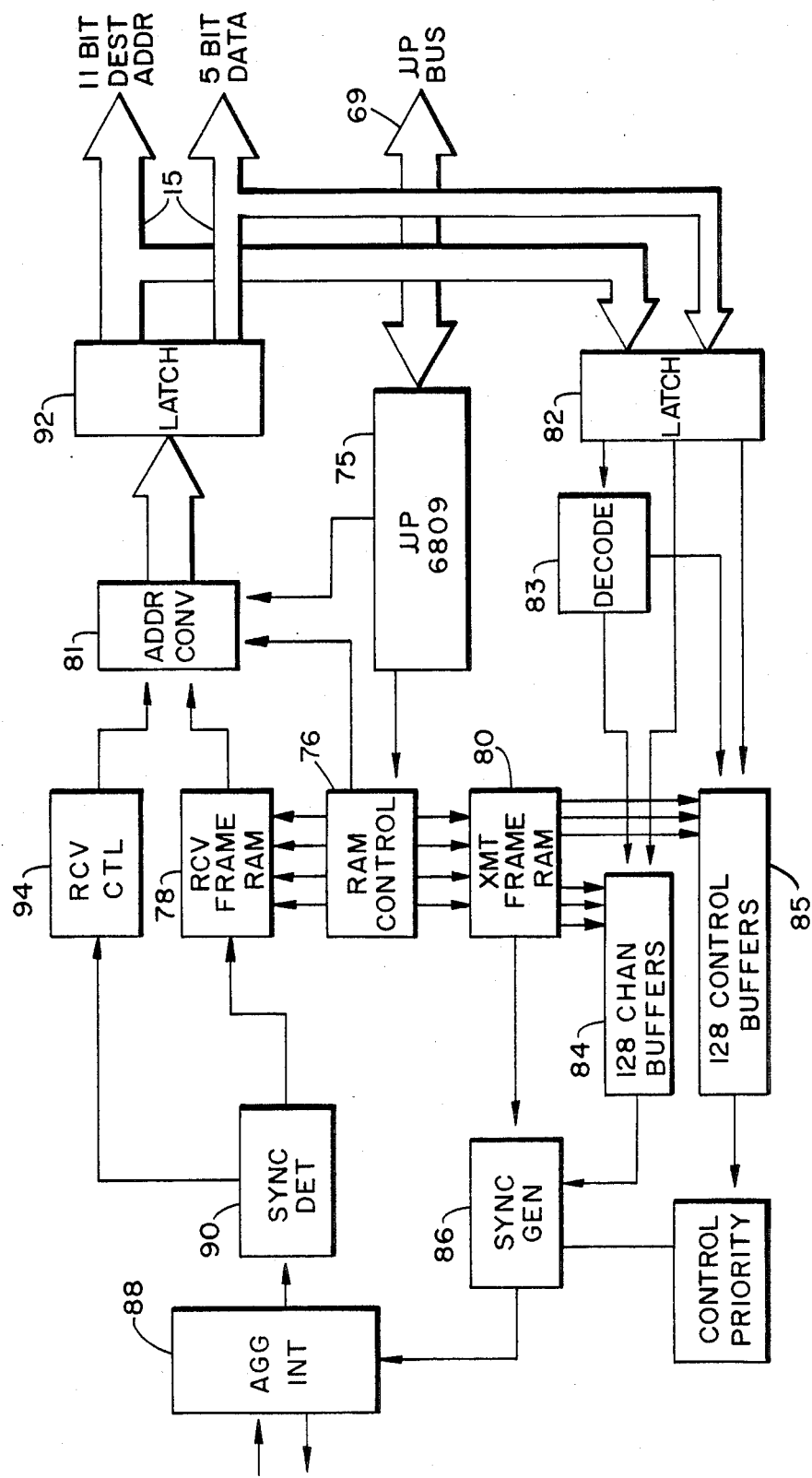
FIG. 4 is a block diagram illustrating the flow of information through the aggregate common means of the invention.

Turning to FIGS. 3 and 4, it is seen that the multiplexer 10 accommodates full duplex communication, and also permits channel to channel and aggregate to aggregate internal communication. Thus, in FIG. 3, a simplified channel common means 20 is provided to show the flow of information through the means 20. The channel common means 20 includes a microprocessor 50, a RAM control 54, a channel RAM 58, and an address converter 62, and a transmit/receive section including latches 64 and 66, a decoder 67, and decode driver 68. The microprocessor 50 is responsible for frame calculation and channel control, and it communicates with the system controller 30 via microprocessor bus 69, and to individual channels via a response bus 74. The frame for multiplexing up to one hundred twenty-eight channels of information is loaded by RAM control 54 into the channel RAM 58 where it is stored. The frame is preferably built by the microprocessor according to the teachings of U.S. Pat. Nos. 4,122,309 and 4,460,993, which are assigned to the assignee herein. When a signal from RAM control 54 increments an address in channel RAM 58, RAM 58 indicates whether the next select is of data or control information. If the select is for data from a channel, a transmit select 70a issues from the channel common means to the channel identified by the RAM 58. In response, the channel transmits data at 70b, and the data is stored in parallel with four other bits (i.e. a flag bit, null bit, a preset sync bit (sync=1), and extra bit) sequentially in a FIFO buffer-latch 64. Along with the data sent over the transmit data line 70b, an eleven bit intramultiplexer system address is generated by address converter 62 under the direction of RAM control 54. The eleven bit system address is stored in parallel with the five information bits in latch 64. If, on the other hand, the select indicated by RAM 58 is for control information, the channel RAM 58 addresses a control select generator 71 and control information therein issues therefrom. The control information i obtained by control select generator 71 via line 72b according to selects generated over line 72a and in accord with the teachings of commonly owned U.S. Pat. No. 4,437,182. Thus, when RAM 58 selects a channel control, four bits of control information are sent by control select generator 71 to the address converter, where an eleven bit intramultiplexer system address is generated. As with the information bits, the control bits and system address accompanying the control bits are stored in latch 64.

When the channel common means 20 is selected by the system control 30, one set of information bits and system address bits contained in the buffer of latch 64 is placed onto the high speed bus 15. While all contributors to the bus have access to the information and the system address, only that contributor having the address of the first four address bits accepts the five information and remaining seven address bits. Thus, in the receive section of the channel common means 20, the latch 66 stores the sixteen bits on the bus, and the four contributor address bits are compared in the decoder 67 with the contributor address. If a match is made, and the five information bits do not indicate a null data word, the decode driver 68 is loaded with the seven bit channel address and the five information bits. The decode driver 68 then sends the five information bits, or some stripped version thereof to the indicated channel. Those skilled in the art will recognize that the arrangement of the multiplexer where all contributors have access to a single high speed bus permits the performance of a loop-back by allowing a contributor to address itself.

In FIG. 4, the data flow through an aggregate common means is shown with a simplified block diagram of the aggregate common means 25. It will readily be appreciated that many aspects of the aggregate common means 25 are similar, if not identical, to the channel common means 25. Thus, the aggregate common means includes a microprocessing section, a transmit section, and a receive section. The microprocessing section has a microprocessor 75 which performs frame calculation, and which uses RAM control 76 to load the frames into a receive frame RAM 78, and a transmit frame RAM 80. The microprocessor 75 also loads the address converter 81 with routing information which it has received from the system control 30 via the microprocessor bus 69.

The transmit section of the aggregate common means has a transmit frame 80, a latch 82, a decoder 83, channel and control buffers 84 and 85 and a sync generator 86, and in some manners functions similarly to the receive section of the channel common means 20. Thus, the latch 82 stores the sixteen bits (five information bits, and eleven system address bits) on the bus, and the four contributor address bits are compared in the decoder 83 with the contributor address. If a match is made, and the flag bit indicates the transmission of a data bit, and a null data word is not indicated, a buffer 84 corresponding to the seven bit channel address is loaded with the data bit which is to be transmitted over the aggregate. If the flag bit indicates the transmission of control bits, the control buffer 85 of the addressed channel is loaded with the control bits. The bits of information in buffers 84 and 85 are then sent over the aggregate via the synchronization generator 86 and aggregate interface 88 according to the transmit frame in RAM 80.

The receive section of the aggregate common means 25 has a receive frame RAM 78, an address converter 81, a sync detector 90, a receive control section 94, and a latch 92 and in some manners functions in a similar manner to the transmit section of the channel common means 20. The aggregate common means receive section receives information via the aggregate interface 88 and locates the frame bits of the received aggregate bit stream in the sync detector 90. Using the frame bits as a reference, the receive frame RAM 78 disassembles the bit stream into channel data, channel controls and multiplexer overhead. The channel data bits are processed such that the data is stored in parallel with four other bits (i.e. a flag bit, null bit, sync bit, and extra bit) and the five information bits are tagged with an eleven bit system destination address by the address converter 81 under the direction of RAM control 76 and the microprocessor 75. The eleven bit intramultiplexer system address is stored in parallel with the five information bits in latch 92. If the information received by the aggregate common receive section is control information, the information is processed by the receive control section 94 which sends a five bit control word (a flag bit and four bits of control information) with a seven bit address to the address converter 81, where an eleven bit system address is generated. As with the information bits, the control bits and system address accompanying the control bits are stored in latch 92.

With the agggregate common means 25 so arranged, those skilled in the art will appreciate that a nodal bypass is easily accomplished without the use of additional hardware. To accomplish the same, information which is destined for a remote multiplexer but which is routed through an aggregate common means 25 of the instant multiplexer 10 will have an intramultiplexer system address of another aggregate common means of multiplexer 10 tagged to it. The address converter 81 of the receiving aggregate common means will be informed by the system controller 30 via the aggregate common means microprocessor 75 of the aggregate (and channel) to which the information is to be sent.

Having described the design of the multiplexer of the invention and the data flow therethrough in basic terms, the details of the preferred embodiment of the components of multiplexer 10 are seen in FIGS. 5, 6, and 7a–7c.

As previously indicated, the system control means 30 of the invention provides clock generation and ring counter circuitry used to generate selects of the information contributing means 20 and 25. The system control means 30 also provides intramultiplexer system coordination, and performs, controls and stores all nodal configuration information such as information routing and channel selection and all diagnostic management. The system control means is driven by a microprocessor and uses a microprocessor bus to communicate with each contributing means and to perform and control system configuration.

Figure 5:
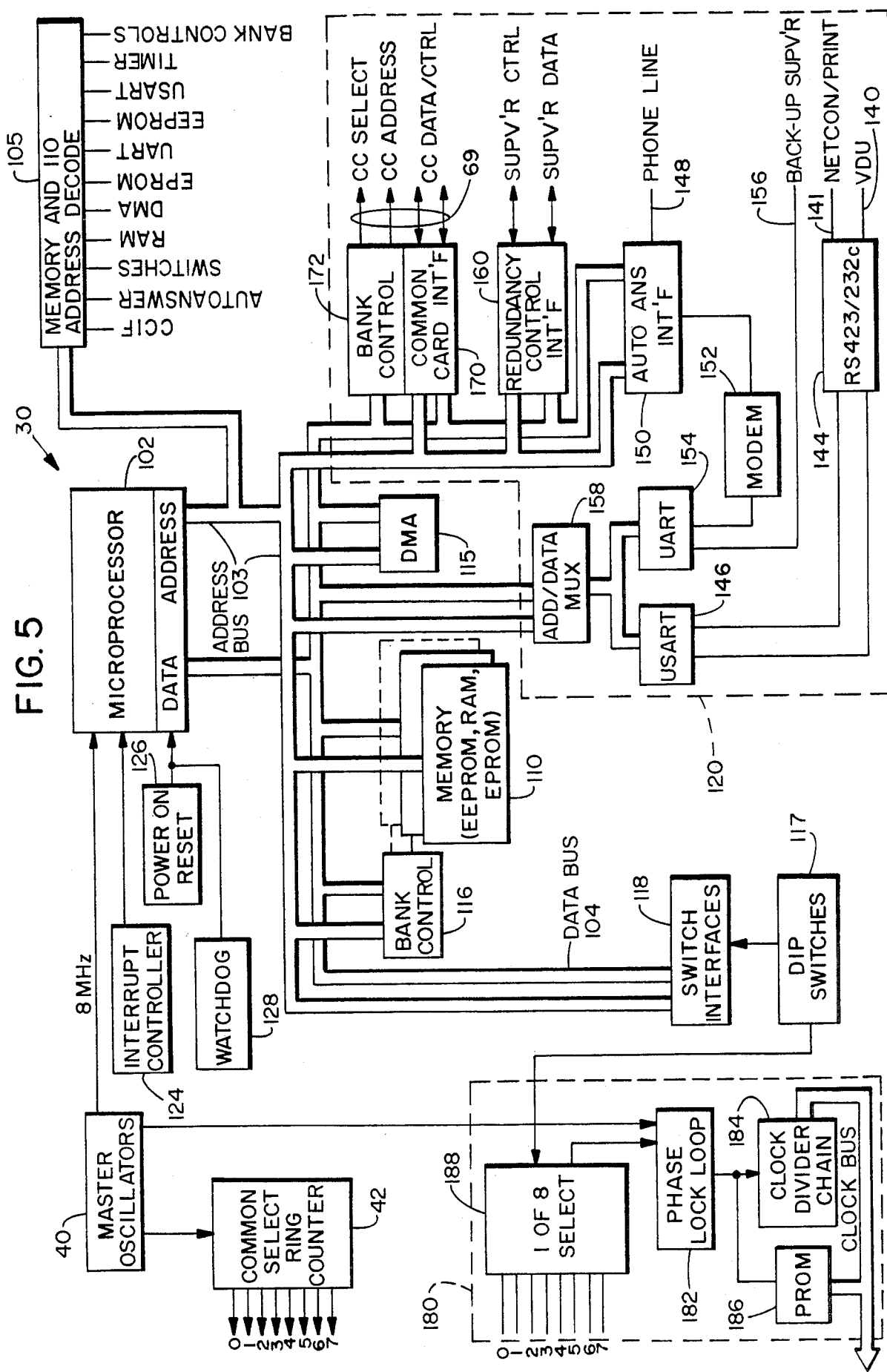
FIG. 5 is a block diagram of the system control of the invention.

Turning to FIG. 5, the circuitry for performing the various functions of the system control means 30 is seen in block diagram format. The "brains" of the system is located in the microprocessor 102 which is preferably a 68B09 manufactured by Motorola. The microprocessor controls most of the functions of the system controller via internal system controller address bus 103 and data bus 104. The memory and input-output address decoder 105 of the microprocessor indicates that various addresses of the memory of microprocessor 102 interface with the system controller memories 110, including a EEPROM, and EPROM, a RAM, and the interface section 120. The EEPROM of memory 110 is used to store application routines, operating program software, nodal configurations, information path maps through the multiplexer, other common routines, etc., in a relatively permanent environment. The EEPROM may be preprogrammed, or it may be programmed, modified, or maintained by the user via a network controller such as is disclosed in Publication No. 058R671, May 1986, published by General DataComm, Inc., the assignee herein. The EPROM of memory 110 is used to store the most permanent elements of the software including self test routines, bootstrap program loads, the operating system, and common routines and vector tables used during interrupt servicing. The RAM of memory is used to store information of a purely temporary nature such as stack pointers and tables, a well as for scratch-pad calculations for configuration determinations etc.

If desired, various additional elements may be provided to enhance the functioning of the microprocessor 102. Thus, in order to help the microprocessor 102 interface with memory 110, a direct memory access 115 may be provided. Likewise, if additional memory is desired or required, a bank control 116 may be provided so that more memory may be accessed with the same number of address bits. Further, dip switches 117 and switch interfaces 118 may be provided for providing additional functions.

The microprocessor 102 itself is subject to a modicum of control by various elements of the system controller 30. The interrupt controller 124 controls and prioritises interrupts received by the microprocessor from other elements of the controller 30 such as e.g. interface circuitry, or memory elements. When an interrupt is processed, the controller 124 generates a vector which is used by the software to enter the appropriate interrupt service routine. The power on reset 126 generates reset pulses during the power up phase to ensure that the hardware starts in an orderly fashion, and during power disturbances to prevent writing into the EEPROM of memory 110 when the voltage supply is low. The watchdog timer 128 guards agains the software of the microprocessor entering into a fatal loop. The watchdog 128 is software driven in that the software periodically sets the timer. If a period of real time transpires without the watchdog timer 128 being reset, the timer will expire and cause the highest priority interrupt to occur in the microprocessor 102 so that appropriate action may be taken.

The system controller 30 interfaces with the contributing means of the multiplexer 20 and 25 and with data communication means outside the multiplexer via the interface section 120. Thus, in the preferred embodiment, four serial communications data links can be connected to the system controller. An operator controlled video display unit link 140 or a network controller link 141 may be connected via an RS423 and/or RS232C port 144 and a universal synchronous/asynchronous receiver transmitter (USART) 146. In this manner, an operator can control information routing, nodal configurations, etc. in a remote or local manner by communicating via a higher level controller such as an IBM PC with the system control means 30. A third serial communication link of interface section 120 is a modem link 148. The system supports the ability to provide system instructions by an operator over a telephone line via an auto answer interface 150, a modem 152, and a universal asynchronous receiver transmitter (UART) 154. Finally, a serial data link 156 links a back-up system controller (not shown) and the system controller 30 via the UART 154. This serial port permits the backup system controller to be loaded with the same information as the system controller 30 which is in service. With all four serial data communication links 140, 141, 148 and 156, an address/data multiplexer 158 is used to take the information received by the UART 154 or USART 146 and direct it onto the proper bus (e.g. the address or data busses 103 or 104).

Another aspect of the interface section 120 of the system controller 30 is the interface 160 with the redundancy control means (not shown), of which the back-up supervisor is an element, and the interface 170 with the information contributing means 20 and 25. The redundancy control means (not shown) provides control of redundant circuitry for all of the other elements of the multiplexer. As a result, proper functioning of the multiplexer is permitted even when certain elements are being serviced or are not functioning properly. The contributing means interface 170 is an interface with the dual port RAMs of all the contributing means 20 and 25. Because all the contributing means use a common block of system control microprocessor memory, a bank control 172 selects which of the contributing means is accessed at any given time. Contention circuitry for the dual port RAMs of the contributing means resides in the contributing means.

The final and perhaps most important functions of the system controller 30 for purposes of this application are the clocking and selecting functions. The system controller 30 includes a master clock 40 and ring counter circuitry 42 which are used to generate selects of the contributing means 20 and 25. The rate of clock 40 is preferably set at 16.896 Mbit/second, which will permit up to sixteen contributors each having a 1.056 Mbit rate to place information on the bus in a sequential manner according to select ring counter 42. It should be appreciated that while such information rates may be accommodated, the contributors need not supply real information at those rates. Thus, null data may be placed on the asynchronous high speed bus 15 if the polled contributor has no information to contribute. Those skilled in the art will also recognize, that if desired, instead of a sequential select ring counter 42, a frame may be used to change the end rates. Thus, contributors could be allowed to have maximum rates in multiples or fractions of the standard 1.056 Mbit rate preferably provided.

The clock 40 is also used in conjunction with circuitry 180 to generate aggregate rate clocks for the multiplexer 10. The circuitry 180 provides for the derivation of standard clocks through the use of a phase lock loop 182 and clock dividers 184, and for the derivation of non-standard clocks through the use of the phase lock loop 182 and a PROM 186. If the multiplexer 10 is a slave node, the clocks are phase locked by loop 182 to an incoming aggregate selected at 188. Thus, it will be appreciated that different aggregates connected to different aggregate common means 25 may have different bit rates.

Figure 6:
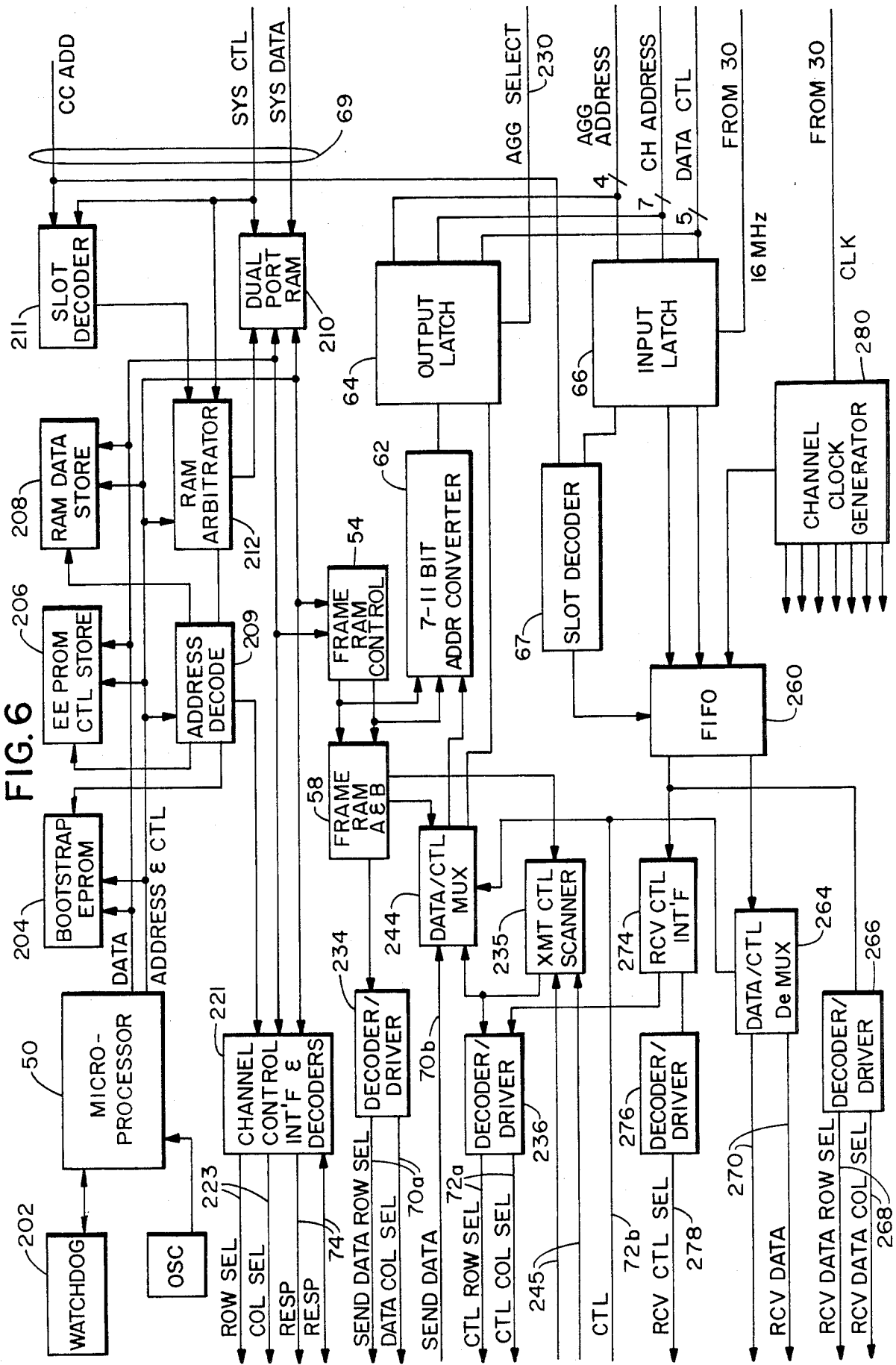
FIG. 6 is a block diagram of the channel common means of the invention.

Turning to FIG. 6, the details of the channel common data contributor 20 are seen. As aforestated, in the preferred embodiment of the multiplexer 10, the channel common card 20 multiplexes data and controls from up to one hundred twenty eight channels and puts the multiplexed data and controls on the common bus 15. In order to perform its multiplexing function, the channel common card contains a microprocessor 50. The primary functions of the channel common means microprocessor 50 are to calculate and implement the transmit frame of the channel common means 20 and to conduct diagnostics. The functions of the microprocessor are monitored and aided by a watchdog timer 202 which initiates a hardware reset upon a failure of the microprocessor or a power failure, a bootstrap EPROM 204 which stores the initialization routines of the microprocessor 50 and the program to download software updates, and an EEPROM 206 which stores the operating program of the microprocessor as well as saving the information for the particular configuration of the channel common means 20. A RAM store 208 is further included as a memory for calculations and for information which is to be loaded into the EEPROM 206 or into the frame RAM 58. In performing its functions, the microprocessor must access the EPROM 204, EEPROM 206 and RAM 208, and therefore requires an address decoder 209. The address decoder 209 decodes the most significant address bits to determine to which part of the memory the microprocessor is communicating.

In calculating the frame, the microprocessor 50 takes into account any information sent to the channel common 20 by the system control 30. That information, including status, commands, responses, configurations, etc. is sent from the channel common interface 170 of the system controller 30 via microprocessor bus 69 into the dual port RAM 210 of the channel common 20 only when slot decoder 211 indicates that the information is meant for the particular channel common means 20. Because both the microprocessor 50 of the channel common means 20 and the system controller 30 have access to the dual port RAM 210, a RAM arbitrator 212 is used to send a busy signal to either the microprocessor 50 or the common card interface 170 of the system controller 30. Microprocessor 50 is also enabled to conduct communication with individual channels via the channel control interface 221 and the response busses 74. Select busses 223 permit several functions such as loop back, diagnostics, status, speed setting, etc. to be conducted via response busses 74.

Because the channel common means 20 is responsible for taking data and controls from channels and sending them out over the high speed bus 15, and for receiving data and controls from the high speed bus and sorting and sending them to the proper channel, transmit and receive circuitry is included. When the system controller 30 uses ring counter 42 to select at 230 the channel common means 20, the information in output latch 64 is loaded onto the high speed bus 15.

In providing the output latch 64 with information, the frame RAM 58, which was loaded with the transmit frame by the microprocessor 50 via the frame RAM control 54, generates selects of data through the use of a decoder/driver circuit 234 and the selects of control information through the use of transmit control scanner 235 and decoder/driver 236. Thus, for data, the decoder/driver 234 sends the selects on lines 70a based on a seven bit channel address received from the frame RAM 58. The seven bit address determines the channel number from which the data is to be selected. In response to the data select, a data bit is sent on line 70b to the data/control multiplexer 244. If the frame RAM 58 indicates a control select, the transmit control scanner 235 generates a seven bit address for the data/control multiplexer 244 which had already stored channel control information. The multilexer 244 obtained the control information as the transmit control scanner 235 had directed decoder/driver 236 to select channel controls via lines 72a, and the controls had been returned via line 72b to the data/control multiplexer 244. In addition, the scanner 235 may be apprised of the existence of priority control information via lines 245 and may tailor its selects of control information based on that input. Thus, the multiplexer 244, which is receiving data from line 70b, control information from line 72b, and channel address information from frame RAM 58 and from transmit control scanner 235 multiplexes the signals to form a seven bit address accompanying a five bit data or control word. As aforementioned, if a data word is to be sent, the five bits of information comprise the data bit supplied by line 70b, a flag bit, a null bit, a predetermined sync bit (as the sync bit is used by the aggregate means only), and an extra undefined bit all supplied by the data/control multiplexer 244. If control information is to be sent, four of the five bits are control bits, and the fifth bit supplied by the data/control multiplexer 244 is a flag bit. The seven bit address added by the multiplexer 244 is the channel origination address. The seven bit origination address is then sent to a seven to eleven bit address converter 62 which provides an eleven bit intramultiplexer system address which defines to which channel of which contributing means the information is to be sent. In order to convert the origination address into an eleven bit intramultiplexer system destination address, the address converter 62 contains a routing table which was generated by the microprocessor 50 and its associated circuitry under the direction of the system controller 30. It is of note that the origination and destination address are not related. The eleven bit intramultiplexer address and five information bits are then loaded into the output latch 64 where they are kept until being selected for output onto the high speed bus 15. In sum then, the multiplexer 244, frame 58, address converter 62, latch 64, and decoder/drivers 234 ad 236 may all be considered as elements of a chnnel common multiplexer which multiplexes information from a plurality of channels and sends that information with an intramultiplexer address over the high speed bus.

On the receiving side, the channel common means 20 receives the sixteen bits of information comprising four information contributing means identifying bits, seven channel identifying bits, and five information bits, from the high speed bus 15. The input latch 66 stores the sixteen bits of information every clock cycle. the four bits for identifying the contributing means is then compared in the address recognizing slot decoder 67 with the coded address of the particular means 20. If a match is made, and the information bits do not indicate a null data word, a FIFO buffer 260 is loaded with the seven bit channel address and the five information bits. The demultiplexer 264 is then used to determine whether the five information bits contain data or control words (i.e. whether the flag bit is a "0" or a "1"). If the information is a data word, the channel which is to receive the data bit is decoded by decoder/driver 266 which selects the channels via lines 268. The data is then sent to the selected channels via lines 270. If control information is indicated by the flag bit, the address is received at the control interface 274 which drives the decoder/driver 276. In turn, the decoder/driver 276 selects the channel to receive the control information via line 278, and the control information is sent to the channels over bus 72b. Simultaneously, the control interface 274 informs the decoder/driver 236 which issues transmit control selects that the bus 246 is in use, and that all selects of control information should await the next clock cycle. In sum, the latch 66, FIFO 260, demultiplexer 264, and decoder/drivers 266 and 276 may be considered as a channel common decoder for receiving bits from bus 15 and sending the bits to their proper channels.

The internal clocking of the channel common means 20 is on a multiple of the 1.056 Mbit/sec rate. This rate is derived from the high speed bus 15 rate which can accommodate sixteen contributing means. The clocking for the different channels of the channel common means 20 is derived by channel clock generator 280 which receives different clocks from the system controller clock generator 180. while the internal clocking is preferably at 1.056 Mbit/second, those skilled in the art will recognize that the information on the high speed bus 15 is clocked into the input latch 66 at the 16.896 Mbit/second rate, and hence the slot decoder 67 must make its decision in a similar time frame.

Figure 7A:
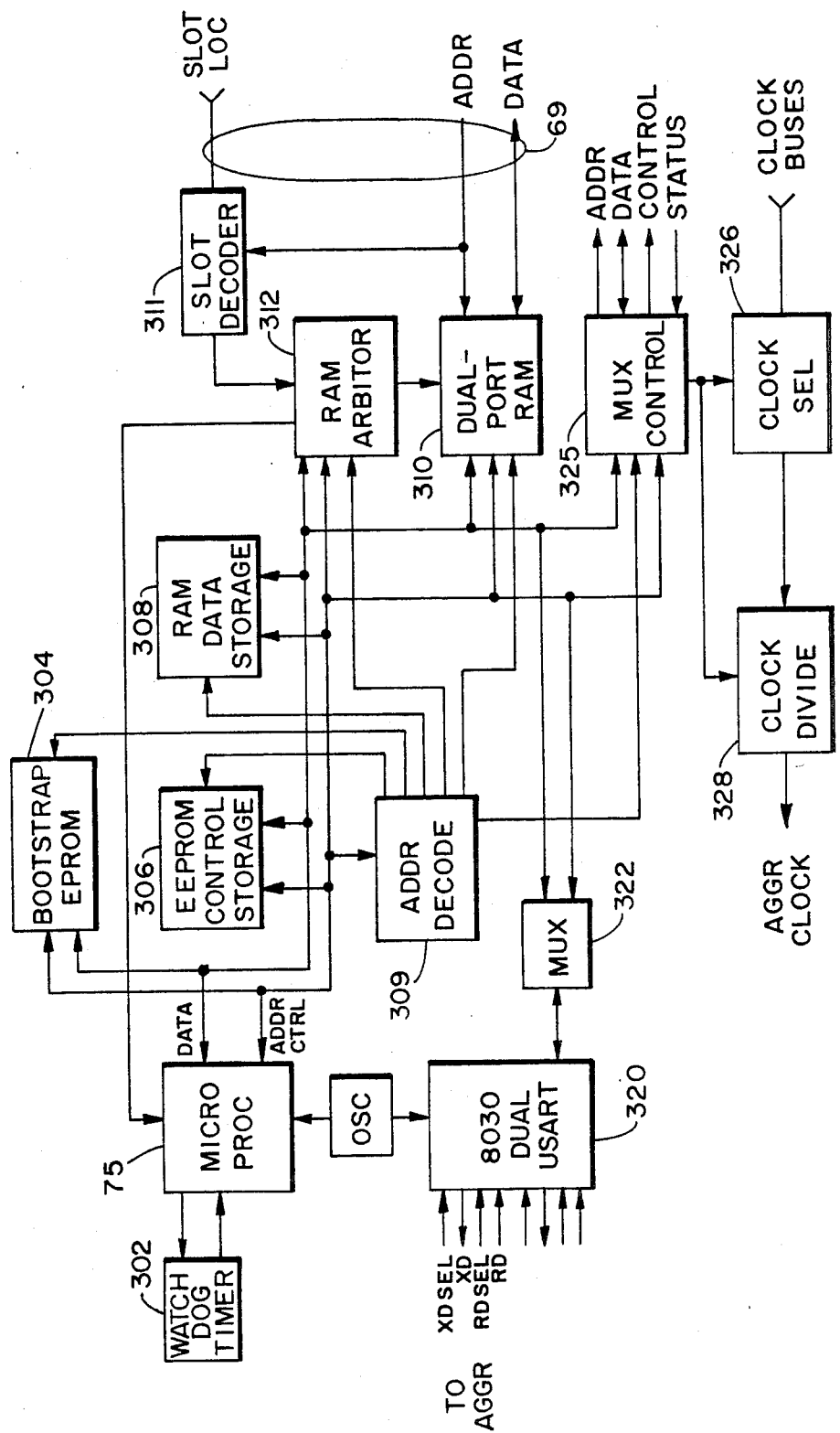
FIGS. 7a, 7b, and 7c are block diagrams of the CPU section, the receive logic section, and the transmit logic section, respectively of the aggregate common means of the invention.
Figure 7B:
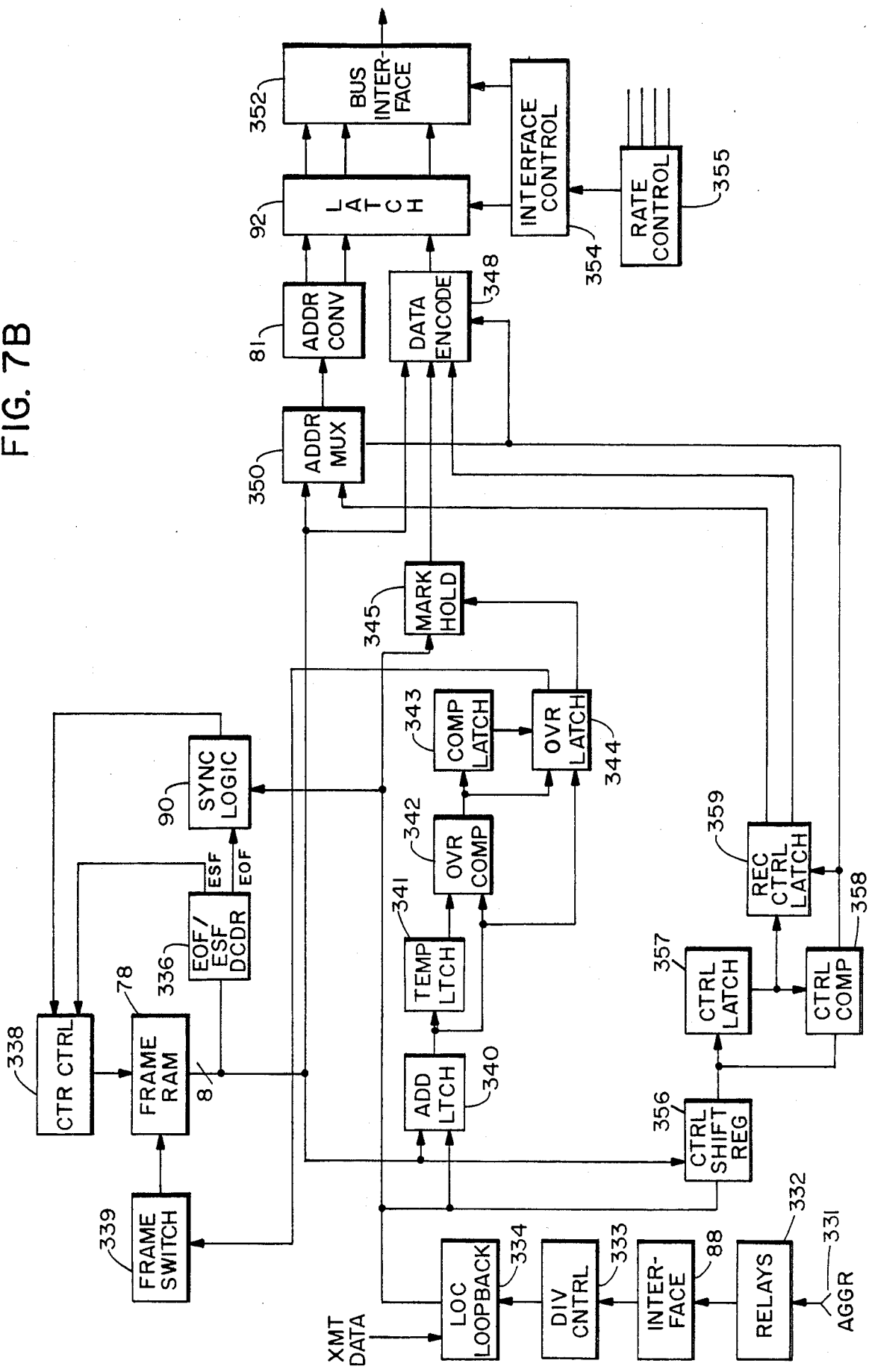
Figure 7C:
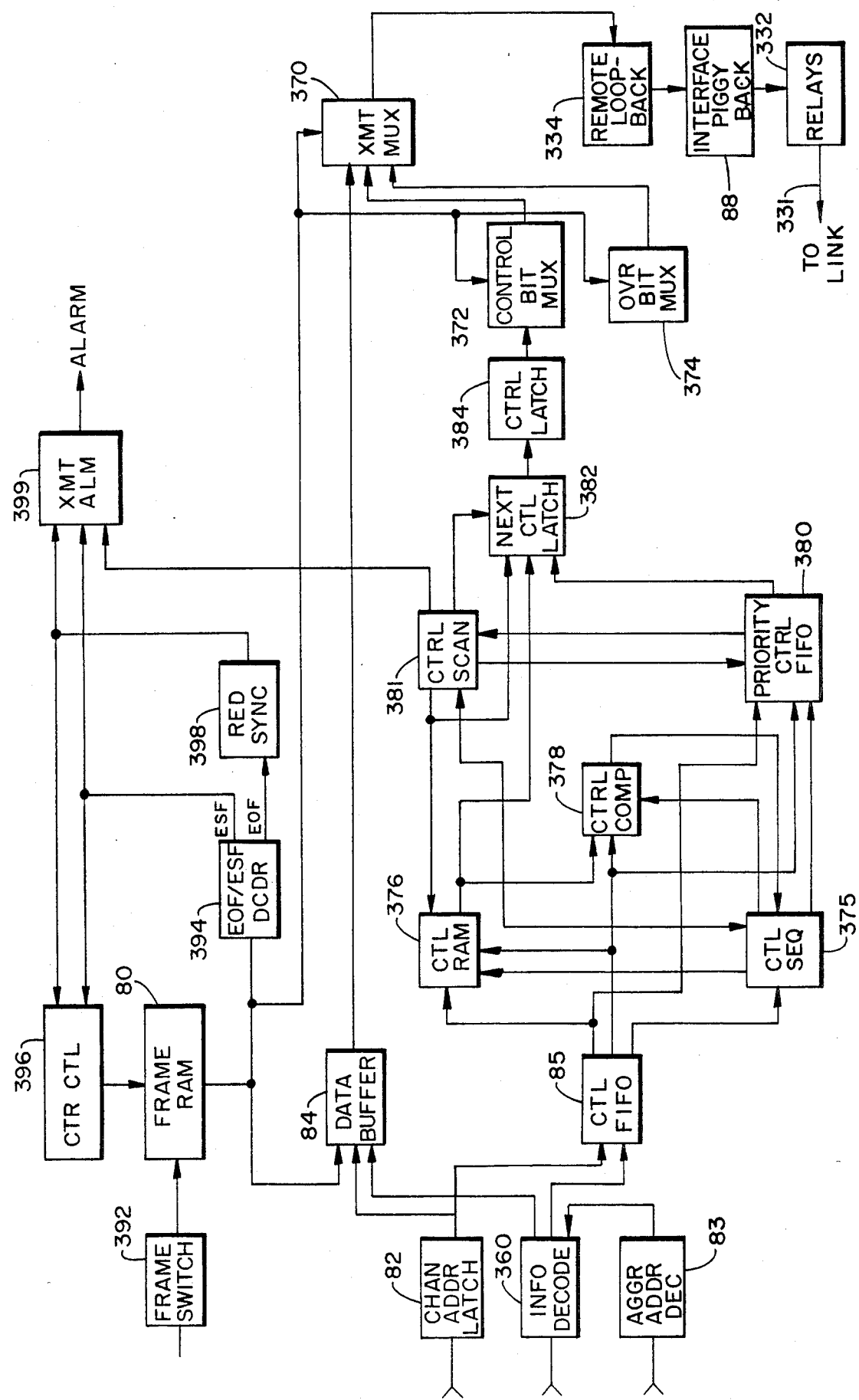

Turning to FIGS. 7a, 7b and 7c, the details of the aggregate common means 25 are seen in block diagram form. As aforestated, the aggregate common means 25 multiplexes information for transmitting over an aggregate and demultiplexes or recodes information from the aggregate. The multiplexed information includes data and controls for up to one hundred and twenty-eight channels, as well as intermultiplexer overhead and synchronization information. In order to accomplish its tasks, the aggregate common means 25 generally includes a CPU section which performs frame calculation and diagnostics, a transmit section which buffers incoming data from the high speed multiplexer bus 15 and processes it by adding overhead and synchronization bits according to the transmit frame before sending it out over the aggregate, and a receive section which disassembles the aggregate data stream into channel data and controls and overhead and sends out the channel data and control with intramultiplexer addressing information onto the high speed bus 15. As the framing and synchronization techniques are not critical to the invention, they are not discussed in detail herein. Reference is made instead to U.S. Pat. Nos. 4,122,309, 4,437,182, 4,437,183, 4,450,558, and 4,460,993, which are all commonly assigned to the assignee herein.

The CPU section of the aggregate common means 25 seen in FIG. 7a is similar in many respects to the microprocessor circuitry of the channel common means 20 seen in FIG. 6. Thus, the functions of the microprocessor 75 are monitored and aided by a watchdog timer 302 which initiates a hardware reset upon a failure of the microprocessor or a power failure, a bootstrap EPROM 304 which stores the initialization routines of the microprocessor 75 and the program to download software updates, and an EEPROM 306 which stores the operating program of the microprocessor as well as saving the information for the particular configuration of the aggregate common means 25. A RAM data store 308 is further included as a memory for calculations and for information which is to be loaded into the EEPROM 306 or into the framing RAMs of the receiving and transmitting sections. In performing its functions, the microprocessor 75 must access the EPROM 304, EEPROM 306 and RAM 308, and therefore requires an address decoder 309. The address decoder 309 decodes the most significant address bits to determine to which part of the memory the microprocessor is communicating.

In calculating the frame, the microprocessor 75 takes into account any information sent to the aggregate common means 25 by the system control 30. That information, including status, commands, responses, configurations, etc. is sent from the data contributor means interface 170 of the system controller 30 via microprocessor bus 69 into the dual port RAM 310 of the aggregate common 25 only when slot decoder 311 indicates that the information is meant for the particular aggregate common means 25. Because both the microprocessor 75 of the aggregate common means 25 and the system controller 30 have access to the dual port RAM 310, a RAM arbitrator 312 is used to send a busy signal to either the microprocessor 75 or the system controller 30.

The CPU section of the aggregate common means also includes hardware not found in the channel common means. Thus, a dual universal synchronous/asynchronous receiver transmitter 320 of the Z8030 type manufactured by Zilog, Inc., is used for serial intermultiplexer communication with a remote multiplexer of a similar type as well as for communication with a redundant aggregate common means (not shown). Because the dual USART 320 requires multiplexed address and data lines, a multiplexer 322 is included to direct the information onto the proper bus. The CPU section also includes a multiplexer control 325 which communicates with the hardware of the aggregate common means and performs functions such as loop backs, diagnostics, loading of the frames and routing RAMS, etc. Finally, a clock select 326 is utilized to select which of the many clocks generated by the system control clock generator 180 is to be used by the clock divide 328 to generate the appropriate aggregate clock The receive logic of the aggregate common means 25 is seen in FIG. 7b. Information being received from the aggregate link 331 enters relays 332 which are provided in order to prevent double termination in the redundant system. The information is then forwarded to the interface 88 which converts the interface voltage level to TTL levels. The converted information is then forwarded to the diversity control 333 which controls the switch over from the primary link to a back-up aggregate link when desired. The information is then sent in a forward manner through a local loopback circuit 334 which permits information from the aggregate common means to be looped back into itself for diagnostic purposes.

Information from local loopback circuit 334 is forwarded to the framing section where synchronization logic 90 operates on the synchronization bits such that the logic 90 can synchronize the receive frame in RAM 78 to the received information. The counter control circuit 338 uses the synchronization information and acts as the pointers to the repeating and non-repeating sections of the frame RAM 78 in order to separate out the data and controls from the incoming information stream (See commonly owned U.S. Pat. No. 4,122,309 for more information regarding the same, and regarding the end of frame/end of subframe decoder 336). If the aggregate common means receive section is not in sync with the remote multiplexer, the frame switch logic 339 in conjunction with sync logic 90 tries to establish synchronization (See commonly owned U.S. Patent No. 4,450,558 for more information regarding the same). The frame switch logic 339 also permits the switching from one frame to another upon command from the remote multiplexer.

The frame RAM 78 demultiplexes the incoming information and provides an address for the incoming information according to techniques well known in the arts, and properly distinguishes between channel data, channel control information, and multiplexer overhead information when synchronization is established. Thus, latches and comparators 340, 341, 342, 343, and 344 are used to interpret the multiplexer overhead information. The addressable latch 340 receives from the frame RAM 78 and stores the overhead bits of one entire frame of the incoming data. Upon receipt by the receive section of the aggregate common means 25 of the first bit of the next frame, the overhead bits are then transferred to a temporary latch 341 to make room for the next frame's overhead bits. After the next frame is completed, the overhead comparator 342 compares the bits stored in both latches, and the results of the comparison is stored in the comparison latch 343. If the present comparison and the previous comparison both prove positive, the overhead bits are transferred to the overhead latch 344 where they may be read by the circuitry so interested. For example, if a frame change is indicated by the overhead bits, the frame switch logic 339 will be apprised of the same. Likewise, if the remote multiplexer is in local loopback mode, the mark hold logic 345 will be apprised, and can force the addressed destination to accept steady mark data while the testing is in progress.

The channel data, to which an address is appended by the RAM 78, is sent to a data encoder 348 which adds a flag bit, a sync bit, etc. The appended address is sent to multiplexer 350 which multiplexes the addresses of the data and control information it is receiving and sends them to the address converter 81. The address converter 81 converts the incoming address into an intramultiplexer address, with the first four bits representing which of the sixteen contributing means 20 or 25 is to receive the information, and the last seven bits representing the channel number in the contributing means. Again, it is of note that the incoming address supplied by the RAM 78 need not be related to the intramultiplexer system address provided by the address converter 81. The encoded data and intramultiplexer address are then sent into a latch 92 which holds the data and address until the next select of the aggregate common means is received. Upon receipt of the next select by the bus interface 352, the data and address is released by the latch 92. The bus interface 352 and latch 92 work together under the control of the interface control 354, and the select rate is controlled by rate controller 355 which is in turn controlled by the system controller 30.

If the received information is channel control information, the information is sent to a control shift register 356 where the control bits for the frame are stored. Once the next frame starts, the bits in the shift register 356 are sent to the control latch 357 where the bits are stored until they are replaced with another set of bits. The control comparator 358 compares the control bits in the shift registe 356 and control latch 357. If the comparison is true, the control information is latched in the receive control latch 359 which signals the multiplexer 350 to receive the address accompanying the control bits, and the control bits are sent to encoder 348 where a flag bit is added. As with for the address from the frame RAM accompanying the data bits, the address from the control latch 359 accompanying the control bits is sent to address converter 81 where an eleven bit intramultiplexer address is supplied. The control bits and address bits are then latched in latch 92 and sent out over the high speed bus 15 when the interface circuitry 352 is selected.

In sum, it will be recognized that the RAM 78, encoder 348, address multiplexer 350, address converter 81, latch 92, and interface circuitry together may be considered to constitute a recoder for obtaining information from an aggregate, supplying the information with an intramultiplexer address, and sending the information with an intramultiplexer system address onto the high speed bus.

Turning to FIG. 7c where the transmit logic of the aggregate common means 25 is seen, the aggregate address information from the high speed bus 15 is received in the aggregate address recognition decoder 83, and if the address matches the particular aggregate address, the information decoder 360 is enabled and the channel address is latched in latch 82. The information decoder 360 decodes the five bits of information into either channel control bits which are placed in the control FIFO 85, null data which is ignored, or channel data which is routed to one of the one hundred and twenty eight data buffers 84. The channel data comprises single data bits, and each is sent to a particular buffer depending on the last seven bits of its intramultiplexer address. The bits in the buffers are then selected by a transmit multiplexer 370 according to the instructions of the frame RAM 80. The frame RAM 80 determines the order of selecting the data buffers 84 according to frames known in the art. The transmit multiplexer 370 actually issues the selects to the data buffers 84 (and to the control bit multiplexer 372 and overhead bit multiplexer 374 as will be described hereinafter), and the multiplexed information is sent to the aggregate 331 via a remote loopback 334, an interface 88, and relays 332 which were all described with reference to FIG. 7b.

If the information in the decoder 360 was control information and was forwarded to control FIFO 85 which buffers the incoming controls, the control information is processed by control circuitry. Thus, when new control information is received in the control FIFO 85, the control sequencer 375 reads the new information. It then calls on the control RAM 376, which stores the controls for each of the channels, to send the information on the received channel to the control comparator 378. The control comparator 378 then compares the control information received from the control sequencer 380 with the control data from the RAM 376 to determine if the control status has changed, i.e. it is priority control. If the control information is priority control, the control sequencer 375 writes the new information into the control RAM 376 and sends the new control and address to the priority control FIFO 380 where they are stored for transmission to the next control latch 382.

The control sequencer 375 also receives control transmit requests. In that situation, the sequencer 375 accesses the control RAM 376 and causes the control information to be sent to the next control latch 382. Control information and addresses are held in the next control latch 382 which acts in conjunction with control latch 384 to buffer the information. The control bit multiplexer 372 which is controlled by the frame RAM 80 and the control scanner logic 381, then selects one of the control bits held in the control latch 384 to be sent to the transmit data multiplexer 370 when selected. The selected control depends on its source. Thus, if control information is being received from the priority control FIFO 380, that information is selected. Otherwise, control information scanned from control RAM 376 is selected. As aforementioned, under control of the RAM 80, the transmit data multiplexer 370 may also select information stored in the overhead bit multiplexer 374. The overhead bits are not received via the high speed bus 15, but are stored in multiplexer 374 for selection by the transmit data multiplexer 370.

As aforementioned, the selects of the transmit data multiplexer 370 are determined by the frame RAM 80. In order to determine which frame is to be run, a frame switch 392 is utilized. The frame switch 392 is controlled by microprocessor 75. Also, in order to properly run the frame RAM, an end of frame/end of subframe decoder 394 is utilized to generate end of frame or subframe pulses. The pulses are used both by a control counter 396 which controls the pointers to the frame and subframes, and by redundant synchronization logic 398 which synchronizes the transmit frames of the backup and in-service aggregate common means transmit logic. If end of frame or end of subframe pulses are not generated, an alarm 399 is activated. It will be appreciated that the alarm can be activated by other elements for other reasons, e.g. by the control scanner 381 if control bits are not being periodically received.

There has been described and illustrated herein a high speed bit interleaved time division multiplexer for multinode communication systems. While particular embodiments of the invention have been described, it is not intended that the invention be limited thereby, as it is intended that the invention be broad in scope and that the specifications be read likewise. Thus, it should be appreciated that while the invention was described as using eleven intramultiplexer address bits to accompany five information bits, those skilled in the art will appreciate that the number of intramultiplexer address bits may be changed as the number is simply a function of the number of information contributors and channels which are accommodated by the system. Likewise, while five information bits were used, with a flag bit determining whether the information was data or controls, a different number of information bits may be provided. Indeed, if more than sixteen control functions are desired, extra information bits might be required. Further, while the handling of control information was described with reference to priority controls and other controls, those skilled in the art should appreciate that other well-known schemes for handling control information such as those disclosed in U.S. Pat. Nos. 4,437,182 and 4,437,183 which are assigned to the assignee herein may be used.

Those skilled in the art should also recognize that for purposes of clarity the term "information" was generally used herein in such a way so as to include "data", "control information" and "overhead information", and the term "data" was generally used more narrowly to suggest true data as opposed to other types of information such as control information. However, because the terms "data" and "information" often overlap, it is intended that the specifications be interpreted with that in mind as additional limitations are not intended to be introduced into the invention solely due to the convention of suc terminology.

Finally, it should be appeciated that while the elements of the invention were described in detail with regard to their components, various configurations which perform identical functions may be arranged, and such configurations should be considered within the scope of the invention. Indeed, configurations with different components which perform the same or similar functions alone or together, configurations which combine or divide the functions of the components described herein, and configurations which include the identical functions of the invention but locate the components in different circuitry sections should all be considered to fall within the scope of the invention. Therefore, it will be apparent to those skilled in the art that other changes and modifications may be made to the invention as described in the specification without departing from the spirit and scope of the invention as so claimed.

I claim:

1. A bit interleaved time division multiplexer for multinode systems having a plurality of aggregate lines, comprising:
   (a) a high speed bus;
   (b) at least two aggregate common means connected to said bus, each aggregate common means including,
      (1) aggregate common address recognition means for recognizing when a particular aggregate common means is being addressed,
      (2) recoding means for obtaining first bits of information from a particular aggregate line in accord with a first frame format, supplying a first intramultiplexer system address for at least one bit of said obtained first bits of information, and sending at least one of said obtained first bits of information accompanied by said first intramultiplexer system address onto said high speed bus,
  (3) aggregate common decoding means for receiving second bits of information from said high speed bus and for sending at least one of said second bits to one of a set of buffers in said particular aggregate common means when said aggregate common address recognition means indicates that said particular aggregate common means is being addressed, and
  (4) aggregate transmit multiplexing means for multiplexing said said bits of information in said set of buffers of said particular aggregate common means according to a second frame format and for sending said multiplexed bits of information over said particular aggregate line; and
(c) system control means connected to said high speed bus, said system control means including means for generating select signals for each of said at least two data aggregate common means, wherein when said particular aggregate common means is selected it sends at least a bit of said first bits of information accompanied by said first intramultiplexer system address on said high speed bus.

2. A multiplexer according to claim 1, wherein:
said further includes a microprocessor;
said recording means and said aggregate transmit multiplexing means are at least partially controlled by said microprocessor; and
said system control means further includes common control means for instructing said aggregate common means microprocessor regarding system configurations such that said microprocessor may properly control said recoding means and said aggregate transmit multiplexing means.

3. A multiplexer according to claim 2, wherein:
in order to provide a nodal bypass, said first intramultiplexer system address supplied by said recoding means of one of said first and second aggregate common means for said first bits of information is an address of the other of said first and second aggregate common means.

4. A multiplexer according to claim 3, wherein:
said high speed bus is an asynchronous high speed bus.

5. A multiplexer according to claim 4, wherein:
said recoding means of said first and second aggregate common means are arranged to supply said first bits of information at different rates for sending over said high speed bus.

6. A multiplexer according to claim 5, wherein:
said aggregate transmit multiplexing means of said first and second aggregate common means are arranged to send said second bits of information over said first and second aggregate lines at different rates.

7. A multiplexer according to claim 1, wherein:
each said first bit of information received by said recoding means of said aggregate common means is recoded with at least a flag bit to indicate whether said first bit of information is control information, and said intramultiplexer address supplied by said recoding means is sent in parallel with said first bit of information and at least said flag bit over said high speed bus.

8. A multiplexer according to claim 7, wherein:
when said first bit of information is a control bit, said flag bit is arranged to indicate the transmission of control bits, and said control bit and three additional control bits and said flag bit are sent together with said intramultiplexer address in parallel over said high speed bus.

9. A multiplexer according to claim 1, further comprising:
(b) at least one channel common means connected to said high speed bus, each of said channel common means including,
  (1) channel common address recognition means for recognizing when a particular channel common means is being addressed,
  (2) channel common decoder means for receiving third bits of information from said high speed bus and for sending said third bits to their proper channels when said channel common address recognition means indicates that said particular channel common means is being addressed, and
  (3) channel common multiplexing means for multiplexing fourth bits of information from a plurality of channels according to a third frame format, for supplying a second intramultiplexer system address to accompany at least one of said fourth bits of information over said high speed bus, and for sending at least one said fourth bit of information accompanied by said second intramultiplexer system address onto said high speed bus, wherein
said system control means further includes means for generating select signals for said at least one channel common means, and said channel common means sends at least said fourth bit of information accompanied by said second intramultiplexer system address on said high speed bus when selected.

10. A multiplexer according to claim 9, wherein:
said aggregate common means further includes a first microprocessor;
said recording means and said aggregate transmit multiplexing means are at least partially controlled by said first microprocessor;
said channel common multiplexing further includes a second microprocessor;
said channel common multiplexing means is at least partially controlled by said second microprocessor; and
said system control means further includes common control means for instructing said first and second microprocessors regarding system configurations such that said microprocessors may properly control said recoding means, said aggregate transmit multiplexing means, and said channel common multiplexing means.

11. A multiplexer according to claim 10, wherein:
in order to provide a nodal bypass, said first intramultiplexer system address supplied by said recoding means of one of said first and second aggregate common means for said first bits of information is an address of the other of said first and second aggregate common means.

12. A multiplexer according to claim 11, wherein:
said high speed bus is an asynchronous high speed bus.

13. A multiplexer according to claim 12, wherein:
at least one of said recoding means of said at least two aggregate common means and said channel common multiplexer of said at least one channel common means is arranged to supply one of said first and said fourth bits of information at a different rate than another of said recoding means of said at least two aggregate common means and said channel common multiplexer of said at least one channel common means, for sending over said high speed bus.

14. A multiplexer according to claim 13, wherein:

said aggregate transmit multiplexing means of said first and second aggregate common means are arranged to send said second bits of information over said first and second aggregate lines at different rates.

15. A multiplexer according to claim 9, wherein:

each said first bit of information received by said recoding means of said aggregate common means and each said fourth bit of information received by said channel common multiplexing means from said plurality of channels is recoded with at least a flat bit to indicate whether said first or fourth bit of information is control information, and said first intramultiplexer address supplied by said recoding means and said second intramultiplexer address supplied by said channel common multiplexing means is sent in parallel with said first or fourth bit of information respectively and at least said flag bit over said high speed bus.

16. A multiplexer according to claim 15, wherein:

when said first or fourth bit of information is a control bit, said flag bit is arranged to indicate the transmission of control bits, and said control bit and three additional control bits and said flag bit are sent together with said first or second intramultiplexer address in parallel over said high speed bus.

17. A bit interleaved time division multiplexer, comprising:

(a) a high speed bus;

(b) at least one aggregate common means, each aggregate common means including, (1) aggregate common address recognition means for recognizing when a particular aggregate common means is being addressed, (2) recoding means for obtaining first bits of information according to a first frame format over an aggregate line, supplying a first intramultiplexer system address for at least one bit of said first bits of information, and sending said at least one said first bit of information accompanied by said first intramultiplexer system address onto said high speed bus, (3) aggregate common decoding means for receiving second bits of information from said high speed bus and for sending said second bits to one of a set of buffers in said particular aggregate common means when said aggregate common address recognition means indicates that said particular aggregate common means is being addressed, and (4) aggregate transmit multiplexing means for multiplexing said second bits of information in said set of buffers of said particular aggregate common means according to a second frame format and for sending said second bits of information over said aggregate line ;

(c) at least one channel common means, each channel common means including, (1) channel common address recognition means for recognizing when a particular channel common means is being addressed, (2) channel common decoder means for receiving third bits of information from said high speed bus and for sending the received third bits to their proper channels when said channel common address recognition means indicates that said particular channel common means is being addressed, and (3) channel common multiplexing means for multiplexing fourth bits of information from said channels according to a third frame format, for supplying a second intramultiplexer system address to accompany at least one bit of said fourth bits over said high speed bus, and for sending said at least one bit of said fourth bits accompanied by said second intramultiplexer system address onto said high speed bus; and (d) system control means connected to said high speed bus, said system control means including means for generating select signals for each of said aggregate common and channel common means, wherein when said channel common means and aggregate common means are respectively selected they each send at least a first or fourth bit of information accompanied by said first or second intramultiplexer system address on said high speed bus.

18. A multiplexer according to claim 17, wherein:

said aggregate common means further includes a first microprocessor;

said recording means and said aggregate transmit multiplexing means are at least partially controlled by said first microprocessor;

said channel common multiplexing further includes a second microprocessor;

said channel common multiplexing means is at least partially controlled by said second microprocessor; and said system control means further includes common control means for instructing said first and second microprocessors regarding system configurations such that said microprocessors may properly control said recording means, said aggregate transmit multiplexing means, and said channel common multiplexing means.

19. A multiplexer according to claim 18, wherein:

said high speed bus is an asynchronous high speed bus.

20. A multiplexer according to claim 19, wherein:

at least one of said recording means of said at least one aggregate common means and said channel common multiplexer of said at least one channel common means is arranged to supply one of said first and said fourth bits of information at a different rate than another of said recoding means of said at least one aggregate common means and said channel common multiplexer of said at least one channel common means for sending over said high speed bus.

21. A multiplexer according to claim 17, wherein:

each said first bit of information received by said recoding means of said aggregate common means and each said fourth bit of information received by said channel common multiplexing means from said plurality of channels is recoded with at least a flag hit to indicate whether said first or fourth bit of information is control information, and said first intramultiplexer address supplied by said recoding means and said second intramultiplexer address supplied by said channel common multiplexing means is sent in parallel with said first or fourth bit of information respectively and at least said flag bit over said high speed bus.

22. A multiplexer according to claim 21, wherein:
when said first or fourth bit of information is a control bit, said flag bit is arranged to indicate the transmission of control bits, and said control bit and three additional control bits and said flag bit are sent together with said first or second intramultiplexer address in parallel over said high speed bus.

23. A bit interleaved time division multiplexer, comprising:
  (a) a high speed bus;
  (b) at least two channel common means connected to said bus, each channel common means including,
    (1) channel common address recognition means for recognizing when a particular channel common means is being addressed,
    (2) channel common decoder means for receiving first bits of information from said high speed bus and for sending said received bits to their proper channels when the channel common address recognition means indicates that said particular channel common means is being addressed, and
    (3) channel common multiplexing means for multiplexing second bits of information from a plurality of said channels according to a first frame format, for supplying an intramultiplexer system address to accompany at least one of said second bits over said high speed bus, and for sending said at least one second bit accompanied by said intramultiplexer system address onto said high speed bus; and
  (c) system control means connected to said high speed bus, said system control means including means for generating select signals for each of said at least two channel common means, wherein when one of said channel common means is selected it sends at least said second bit of information accompanied by said intramultiplexer system address on said high speed bus.

24. A multiplexer according to claim 23, wherein:
said at least two channel common means each further include a microprocessor;
said channel common multiplexing means of said at least two channel common means are each at least partially controlled by said microprocessor; and
said system control means further includes common control means for instructing each of said channel common means microprocessors regarding system configurations such that said microprocessor may properly control said channel common multiplexing means.

25. A multiplexer according to claim 24, wherein:
said high speed bus is an asynchronous high speed bus.

26. A multiplexer according to claim 25, wherein:
said channel common multiplexing means of said first and second channel common means are arranged to supply said first bits of information at different rates for sending over said high speed bus.

27. A multiplexer according to claim 23, wherein:
said channel common multiplexing means of each of said at least two channel common means further includes recoders for attaching additional third bits of information to each second bit of information received from said plurality of channels and multiplexed by said channel common multiplexing means, said additional third bits of information including at least a flag bit to indicate whether said second bit of information received from said plurality of channels is control information, and wherein said intramultiplexer address supplied by said channel common multiplexing means is sent in parallel with said second bit of information received from said plurality of channels and at least said flag bit over said high speed bus.

28. A multiplexer according to claim 27, wherein:
when said second bit of information received from said plurality of channels is a control bit, said flag bit is arranged to indicate the transmission of control bits, and said control bit and three additional control bits received from said channels and said flag bit are sent together with said intramultiplexer address in parallel over said high speed bus.

* * * * *